Patented Apr. 13, 1954

2,675,403

UNITED STATES PATENT OFFICE 2,675,403

CARBAMATES CONTAINING THE CYCLO-HEPTATRIEN-1-OL-2-ONE RING

Harold E. Cupery, New Castle County, Del., assignor to E. I. du Pont de Nemours and Company, Wilmington, Del., a corporation of Delaware No Drawing. Application July 13, 1951,
Serial No. 236,705

11 Claims. (Cl. 260—471)

This invention relates to new compositions of matter and to methods for their preparation. More particularly this invention relates to a new class of carbamates containing a seven-membered carbocyclic ring and to a novel process for their preparation.

Compounds containing seven-membered rings occur in several natural products. Such compounds in general possess valuable properties with respect to regulating plant growth as well as for pesticidal applications. Of particular interest are carbocyclic compounds, especially those containing the cycloheptatrien-1-ol-2-one ring. These compounds have unique chemical properties, e. g., they exhibit many properties which are generally thought of as being primarily associated with aromatic compounds. Cycloheptatrien-1-ol-2-one (tropolone) has received considerable attention in recent years, since the cycloheptatrien-1-ol-2-one ring exists in certain biologically active products, such as colchicine and fungicides including the thujaplicins which are part of the active portions in cedar wood.

Heretofore, certain carbamates have found use in plant regulant applications. However, no carbamates containing the cycloheptatrien-1-ol-2-one ring have heretofore been known. New compounds which contain this cycloheptatriene ring system and which also contain carbamate groups would have unusual properties, particularly for agricultural use.

It is an object of this invention to provide new compositions of matter and methods for their preparation. A further object is to provide a new class of compounds containing a seven-membered carbocyclic ring and a process for their preparation. A still further object is to provide a new class of compounds containing the cycloheptatrien-1-ol-2-one ring and a carbamate group. Other objects will appear hereinafter.

The objects of this invention are accomplished by providing a new class of carbamates containing the cycloheptatrien-1-ol-2-one ring, the cycloheptatrien-1-ol-2-one carbamates, the halocycloheptatrien-1-ol-2-one carbamates, the nitrocycloheptatrien-1-ol-2-one carbamates and the alkylcycloheptatrien-1-ol-2-one carbamates. These novel compounds can be obtained by reacting cycloheptatrien-1-ol-2-one, a halocycloheptatrien-1-ol-2-one, a nitrocycloheptatrien-1-ol-2-one, or an alkylcycloheptatrien-1-ol-2-one with an isocyanate. The novel carbamates of this invention can also be obtained by reacting a carbamyl chloride with the sodium salt of a cycloheptatrien-1-ol-2-one compound.

A particularly preferred process for the preparation of a product of this invention involves the reaction of cycloheptatrien-1-ol-2-one or a derivative thereof which contains groups non-reactive with isocyanates, including those containing halogen, nitro or alkyl substituents on the carbocyclic ring with an organic isocyanate, including aliphatic and aromatic hydrocarbon isocyanates and substituted hydrocarbon isocyanates. Thus new compositions of this invention, such as the cycloheptatrien-1-ol-2-one carbamates, have been obtained by the reaction of an organic isocyanate with cycloheptatrien-1-ol-2-one.

Tropolone, cycloheptatrien-1-ol-2-one, has the structural formula

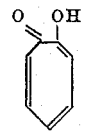

The new carbamates of this invention contain the cycloheptatrien-1-ol-2-one ring and have the general structural formula

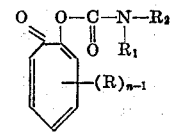

wherein R is a nuclear substituent including halogen, particularly halogen of atomic number 17 to 35 (i. e., chlorine or bromine), nitro, or alkyl, particularly alkyl of 1 to 3 carbon atoms, $n$ is a positive integer selected from the class consisting of 1 to 2, $R_1$ is a hydrogen or an organic radical and $R_2$ is an organic radical. The organic radicals are generally of not more than 9 chain members selected from the class consisting of carbon, nitrogen and oxygen, particularly hydrocarbon of 1 to 6 carbon atoms, or alkoxy or halogen substituted hydrocarbons. When $n$ is 1 there is no nuclear substituted R and the structural formula is that of a cycloheptatrien-1-ol-2-one carbamate which is structurally represented as follows:

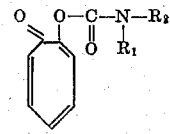

wherein $R_1$ and $R_2$ are as aforesaid.

Particularly preferred classes of the new carbamates of this invention are the cycloheptatrien-1-ol-2-one carbanilates, alkoxycarbanilates and halocarbanilates, the halocycloheptatrien-1-ol-2-one carbanilates, alkoxycarbanilates and halocarbanilates, the nitrocycloheptatrien-1-ol-2-one carbanilates, alkoxycarbanilates and halocarbanilates, and the alkylcycloheptatrien-1-ol-2-one carbanilates, alkoxycarbanilates and halocarbanilates. These carbanilates are represented by the above structural formulas when $R_2$ is phenyl, alkoxyphenyl, particularly where the alkoxy radical is from 1 to 3 carbon atoms, nitrophenyl, or halophenyl, such as chlorophenyl or bromophenyl.

The most preferred classes of the new carbamates are those where $R_1$ is hydrogen and especially the carbanilates where $R_1$ is hydrogen. The structural formula for the preferred carbanilates where $R_1$ is hydrogen is as follows:

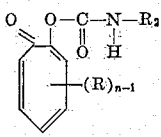

wherein R is a nuclear substituent selected from the class consisting of chlorine, bromine, nitro or alkyl of 1 to 3 carbon atoms, $n$ is a positive integer of 1 to 2 and $R_2$ is phenyl, bromophenyl, chlorophenyl or alkoxyphenyl in which the alkoxy group is of from 1 to 3 carbon atoms.

The following examples in which the parts are by weight further illustrate this invention.

Example I

A mixture of 3.02 parts of 3-bromocycloheptatrien-1-ol-2-one (prepared by the process of Cook et al., Chem. and Ind., 1950, 427) and 2.24 parts of p-methoxyphenyl isocyanate was heated on a steam bath until complete solution resulted and let stand while on the steam bath until solidification occurred. The solid mass was cooled, triturated with anhydrous ether, filtered, and dried. The product obtained amounted to 4 parts (76% of the theoretical) and had a melting point of 112–113° C. The analysis for the p-methoxycarbanilate of 3-bromocycloheptatrien-1-ol-2-one was:

Calc'd. for $C_{15}H_{12}O_4NBr$: C, 51.42%; H, 3.46%; N, 4.00%. Found: C, 51.63%; H, 3.73%; N, 4.05%.

The carbanilate thus obtained gave no color when dissolved in ether containing a small amount of ferric chloride. The addition of water to the ether solution resulted in the slow formation of a green color.

Example II

When the general procedure of Example I was repeated except that 4.02 parts of bromocycloheptatrien-1-ol-2-one was employed with 1.42 parts of ethyl isocyanate, there was obtained 3.5 parts of the corresponding ethylcarbamate of 3-bromocycloheptatrien-1-ol-2-one. The product had a melting point of 99–100° C. and the following analysis:

Calc'd. for $C_{10}H_{10}O_3NBr$: C, 44.13%; H, 3.70%; N, 5.15%. Found: C, 44.28%; H, 3.82%; N, 5.07%.

Example III

When 1.22 parts of cycloheptatrien-1-ol-2-one obtained by the process of Cook et al., Chem. and Ind., 1950, 427, was mixed with 1.19 parts of phenyl isocyanate a clear solution was obtained. The temperature of this solution rose to 45° C. and a solid formed which comprised the carbanilate of cycloheptatrien-1-ol-2-one, which had a melting point of 102–104° C. when recrystallized from a mixture of ether and acetonitrile and the following analysis:

Calc'd. for $C_{14}H_{11}O_3N$: C, 69.70%; H, 4.60%; N, 5.81%. Found: C, 69.92%; H, 4.78%; N, 6.03%.

Example IV

When the general procedure of Example I was repeated except that 2.42 parts of the cycloheptatrien-1-ol-2-one was employed with 3.07 parts of p-chlorophenyl isocyanate, there was obtained 4 parts (corresponding to a 74% yield) of the p-chlorocarbanilate of cycloheptatrien-1-ol-2-one. The compound had a melting point of 135–136.5° C. and the following analysis:

Calc'd. for $C_{14}H_{10}O_3NCl$: C, 60.99%; H, 3.66%; N, 5.08%. Found: C, 60.91%; H, 3.83%; N, 5.07%.

Example V

When the general procedure of Example IV was repeated except that the isocyanate employed was 1.68 parts of adipyl isocyanate, there was obtained 2.5 parts (corresponding to a 61% yield) of the corresponding carbamate, the N-(6-isocyanatohexyl) carbamate of cycloheptatrien-1-ol-2-one. The product had a melting point of 86–88° C. and the analysis for the compound having the structure

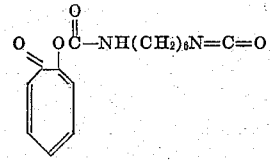

is:

Calc'd. for $C_{15}H_{18}O_4N_2$: C, 62.05%; H, 6.25%; N, 9.65%. Found: C, 62.46%; H, 6.78%; N, 9.47%.

In the place of the cycloheptatrien-1-ol-2-one as employed in the latter examples, other nuclear substitution products that contain as the sole active hydrogen (Zerewitinoff) the hydroxyl hydrogen, can be used. The most suitable and preferred are those which contain an alkyl of 1 to 3 carbons, e. g., as in hinokitiol or thujaplicin, a nitro, e. g., as in 5-nitrocycloheptatrien-1-ol-2-one, or a halogen, particularly bromine or chlorine, as substituents on the carbocyclic ring.

In place of the isocyanates of the examples, other isocyanates that are equally useful include alpha-naphthylisocyanate, o-nitrophenylisocyanate and o-phenylphenylisocyanate. Compounds coming within the scope of this invention also include the N-(alpha-naphthyl) carbamate of 5-isopropylcycloheptatrien-1-ol-2-one, the o-nitrocarbanilate of 3,4-benzocycloheptatrien-1-ol-2-one, and the o-phenylcarbanilate of 5-nitrocycloheptatrien-1-ol-2-one.

The examples illustrate the preparation of the compounds of this invention by the use of isocyanates. Carbamates have been prepared by other methods which can optionally be employed in the preparation of the cycloheptatriene carbamates of this invention. A suitable method involves the reaction of a carbamyl chloride with the sodium salt of a cycloheptatrien-1-ol-2-one.

The exact conditions for the carbamate forming reaction depend upon the specific reagent employed. Temperatures of 20–125° C. or higher are useful. Satisfactory yields are generally obtained at temperatures of about 100° C. when the time of reaction is 1-10 hours. The molar ratio of carbamate forming reagent, e. g., the isocyanate, present should be at least as high as the ratio on a molar basis of the carbocyclic compound present.

The carbamates of this invention can be employed in the formulation of biologically active products. The carbamate group is susceptible to hydrolysis under selected conditions and the compounds may be used as chemical intermediates. These derivatives differ in stability from the parent cycloheptatrien-1-ol-2-ones. The carbamates of this invention are of particular use in the formulation of pesticidal, fungicidal, or plant regulant materials.

As many apparently widely different embodiments of this invention may be made without departing from the spirit and scope thereof, it is to be understood that this invention is not limited to the specific embodiments thereof except as defined in the appended claims.

I claim:
1. A carbamate containing the cycloheptatrien-1-ol-2-one ring and having the general formula:

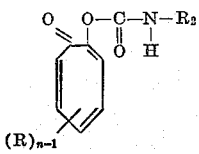

wherein R is selected from the class consisting of halogen of atomic number 17 to 35, the nitro group, the benzo radical, and alkyl radicals of 1 to 3 carbon atoms, $n$ is a positive integer of 1 to 2, and $R_2$ is selected from the class consisting of alkyl radicals of 1 to 6 carbon atoms, alkoxyphenyl in which the alkoxy group is of 1 to 3 carbon atoms, phenyl, biphenyl, monohalophenyl, nitrophenyl, naphthyl, and isocyanato substituted alkyl radicals containing a total of not more than 7 carbon atoms.

2. A carbamate containing the cycloheptatrien-1-ol-2-one ring and having the general formula:

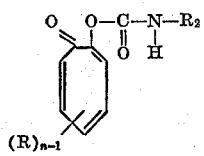

wherein R is bromine, $n$ is a positive integer of 1 to 2, and $R_2$ is an alkoxyphenyl radical in which the alkoxy group contains from 1 to 3 carbon atoms.

3. A carbamate containing the cycloheptatrien-1-ol-2-one ring and having the general formula:

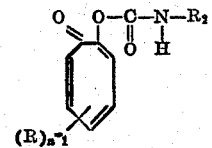

wherein R is bromine, $n$ is a positive integer of 1 to 2, and $R_2$ is an alkyl radical of 1 to 6 carbon atoms.

4. A carbamate containing the cycloheptatrien-1-ol-2-one ring and having the general formula:

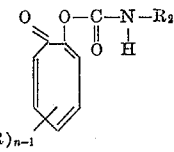

wherein R is bromine, $n$ is a positive integer of 1 to 2, and $R_2$ is phenyl.

5. A carbamate containing the cycloheptatrien-1-ol-2-one ring and having the general formula:

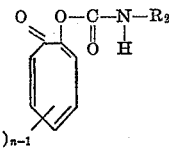

wherein R is bromine, $n$ is a positive integer of 1 to 2, and $R_2$ is chlorophenyl.

6. A carbamate containnig the cycloheptatrien-1-ol-2-one ring and having the general formula:

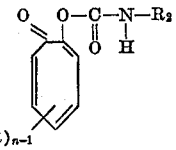

wherein R is bromine, $n$ is a positive integer of 1 to 2, and $R_2$ is an isocyanato substituted alkyl radical containing a total of not more than 7 carbon atoms.

7. The p-methoxycarbanilate of 3-bromocycloheptatrien-1-ol-2-one.

8. The ethylcarbamate of 3-bromocycloheptatrien-1-ol-2-one.

9. The carbanilate of cycloheptatrien-1-ol-2-one.

10. The p-chlorocarbanilate of cycloheptatrien-1-ol-2-one.

11. The carbamate of cycloheptatrien-1-ol-2-one having the structural formula

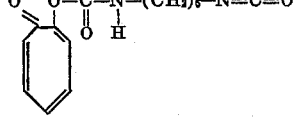

No references cited.